(12) United States Patent
Dingler et al.

(10) Patent No.: US 8,966,114 B2
(45) Date of Patent: *Feb. 24, 2015

(54) SYSTEM AND METHOD FOR PROVIDING PRIVACY AND LIMITED EXPOSURE SERVICES FOR LOCATION BASED SERVICES

(75) Inventors: John R. Dingler, Dallas, GA (US); David C. Olds, Marietta, GA (US); Sri Ramanathan, Lutz, FL (US); Matthew A. Terry, Dunwoody, GA (US); Matthew B. Trevathan, Keenesaw, GA (US)

(73) Assignee: NNG LLC, Budapest (HU)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,600

(22) Filed: Sep. 7, 2012

(65) Prior Publication Data
US 2012/0330543 A1    Dec. 27, 2012

Related U.S. Application Data

(63) Continuation of application No. 12/170,045, filed on Jul. 9, 2008, now Pat. No. 8,332,535.

(51) Int. Cl.
*G06F 15/173* (2006.01)
*H04W 4/02* (2009.01)
*H04W 4/20* (2009.01)
*H04L 29/08* (2006.01)
*H04W 12/02* (2009.01)

(52) U.S. Cl.
CPC ..... *H04W 4/02* (2013.01); *H04W 4/20* (2013.01); *H04L 67/18* (2013.01); *H04W 12/02* (2013.01)
USPC ........... 709/238; 455/411; 340/991; 340/993; 340/994

(58) Field of Classification Search
None
See application file for complete search history.

(56) References Cited

U.S. PATENT DOCUMENTS

| | | | |
|---|---|---|---|
| 5,892,346 A | 4/1999 | Moroto et al. | |
| 6,339,745 B1 | 1/2002 | Novik | |
| 6,360,102 B1 * | 3/2002 | Havinis et al. | 455/457 |
| 6,687,504 B1 * | 2/2004 | Raith | 455/456.1 |
| 6,714,859 B2 | 3/2004 | Jones | |
| 6,795,823 B1 * | 9/2004 | Aklepi et al. | 709/238 |
| 6,829,340 B2 | 12/2004 | Wei | |
| 6,842,695 B1 * | 1/2005 | Tu | 701/410 |
| 6,847,824 B1 | 1/2005 | Contractor | |

(Continued)

FOREIGN PATENT DOCUMENTS

WO      0137518      5/2001

OTHER PUBLICATIONS

Kalnis, et al., "Preventing Location-Based Identity Inference in . . . Spatial Queries", http://www.mysmu.edu/faculty/kyriakos/TKDE07-Spatial%20Anonymity.pdf, 2007, pp. 1-14.

(Continued)

*Primary Examiner* — Ian N Moore
*Assistant Examiner* — Dung B Huynh
(74) *Attorney, Agent, or Firm* — Ladas & Parry LLP

(57) ABSTRACT

A system and method is provided for providing privacy and limited exposure services for location based services. The system includes at least one module configured to provide fictitious location or route information of a mobile user to selected users or group of users based on a mobile user provided profile.

19 Claims, 5 Drawing Sheets

(56) References Cited

U.S. PATENT DOCUMENTS

| | | | |
|---|---|---|---|
| 6,850,161 B1 | 2/2005 | Elliott et al. | |
| 6,853,904 B2 | 2/2005 | Matsuo et al. | |
| 7,006,835 B2 | 2/2006 | Otsuka et al. | |
| 7,006,916 B2 | 2/2006 | Kawasaki | |
| 7,054,648 B2 | 5/2006 | Abtin et al. | |
| 7,088,989 B2 | 8/2006 | Guo | |
| 7,221,928 B2 | 5/2007 | Laird et al. | |
| 7,317,927 B2 | 1/2008 | Staton et al. | |
| 7,327,312 B1 | 2/2008 | Harris | |
| 7,523,160 B2* | 4/2009 | Eida et al. | 709/204 |
| 7,818,125 B2 | 10/2010 | Hatano et al. | |
| 8,024,111 B1 | 9/2011 | Meadows et al. | |
| 8,150,932 B2* | 4/2012 | Waris | 709/207 |
| 8,332,535 B2* | 12/2012 | Dingler et al. | 709/238 |
| 2002/0013812 A1* | 1/2002 | Krueger et al. | 709/203 |
| 2002/0058519 A1* | 5/2002 | Nagahara | 455/456 |
| 2002/0077127 A1 | 6/2002 | Heckard et al. | |
| 2002/0128768 A1* | 9/2002 | Nakano et al. | 701/202 |
| 2002/0174364 A1 | 11/2002 | Nordman et al. | |
| 2003/0008672 A1* | 1/2003 | Fujii | 455/456 |
| 2003/0028317 A1 | 2/2003 | Nagamune | |
| 2003/0078053 A1 | 4/2003 | Abtin et al. | |
| 2003/0083851 A1 | 5/2003 | Nagamune | |
| 2003/0109266 A1 | 6/2003 | Rafiah et al. | |
| 2003/0130893 A1 | 7/2003 | Farmer | |
| 2003/0153310 A1 | 8/2003 | Ishii | |
| 2003/0220736 A1 | 11/2003 | Kawasaki | |
| 2003/0229441 A1* | 12/2003 | Pechatnikov et al. | 701/201 |
| 2004/0106415 A1 | 6/2004 | Maeda et al. | |
| 2004/0203654 A1 | 10/2004 | Bass et al. | |
| 2004/0218895 A1 | 11/2004 | Samadani et al. | |
| 2005/0060575 A1 | 3/2005 | Trethewey et al. | |
| 2005/0078577 A1 | 4/2005 | Horie | |
| 2005/0093720 A1* | 5/2005 | Yamane et al. | 340/995.13 |
| 2005/0202832 A1* | 9/2005 | Sudit | 455/456.1 |
| 2005/0270311 A1* | 12/2005 | Rasmussen et al. | 345/677 |
| 2006/0079203 A1* | 4/2006 | Nicolini | 455/411 |
| 2006/0116818 A1* | 6/2006 | Chao et al. | 701/211 |
| 2006/0149466 A1 | 7/2006 | Kikuchi et al. | |
| 2006/0161343 A1 | 7/2006 | Agnew et al. | |
| 2006/0195570 A1 | 8/2006 | Zellner et al. | |
| 2007/0038368 A1 | 2/2007 | Miyawaki et al. | |
| 2007/0083324 A1* | 4/2007 | Suzuki et al. | 701/201 |
| 2007/0150188 A1* | 6/2007 | Rosenberg | 701/211 |
| 2007/0156326 A1* | 7/2007 | Nesbitt | 701/200 |
| 2007/0264974 A1* | 11/2007 | Frank et al. | 455/411 |
| 2007/0276597 A1 | 11/2007 | Kato et al. | |
| 2007/0282621 A1 | 12/2007 | Altman et al. | |
| 2007/0293197 A1 | 12/2007 | Ekberg et al. | |
| 2007/0299599 A1 | 12/2007 | Letchner et al. | |
| 2008/0114543 A1* | 5/2008 | Vishnu | 701/209 |
| 2008/0133336 A1 | 6/2008 | Altman et al. | |
| 2008/0208457 A1 | 8/2008 | Reed et al. | |
| 2008/0228386 A1 | 9/2008 | Geelen et al. | |
| 2008/0306965 A1 | 12/2008 | Funayama et al. | |
| 2008/0319643 A1 | 12/2008 | Shah | |
| 2009/0047937 A1* | 2/2009 | Zellner et al. | 455/414.1 |
| 2009/0228582 A1 | 9/2009 | White et al. | |

OTHER PUBLICATIONS

Mokbel, Mohamed F., et al., "The New Casper: Query Processing for Location Services without Compromising Privacy", http://www-users.cs.umn.edu/~mokbel/Casper.pdf, VLDB '06 Sep. 12-15, 2006, pp. 1-12.

Chow, Chi-Yin, et al., "A Peer-to-Peer Spatial Cloaking Algorithm for Anonymous Location-based Services", http://www-users.cs.umn.edu/~mokbel/GIS-2006.pdf, ACM-GIS' 06, Nov. 10-11, 2006, pp. 1-8.

* cited by examiner

SYSTEM AND METHOD FOR PROVIDING PRIVACY AND LIMITED EXPOSURE SERVICES FOR LOCATION BASED SERVICES

CROSS REFERENCE TO RELATED APPLICATION

The present application is a continuation of U.S. application Ser. No. 12/170,045, filed Jul. 9, 2008, the contents of which are incorporated by reference herein in their entirety.

FIELD OF THE INVENTION

The invention generally relates to a system and method to provide privacy services to a user of a mobile device and, in particular, a system and method for providing privacy and limited exposure services for location based services.

BACKGROUND

Faced with an increasingly difficult challenge in growing both average revenue per user (ARPU) and numbers of subscribers, wireless carriers are trying to develop a host of new products, services, and business models based on data services. One such service is location services, which provide information specific to a location including actual locations of a user. It is expected that location based services will generate additional business for the carrier, from both the mobile user and content providers.

For the mobile user as well as the service provider, location-based services offer many opportunities. For example, location-based services can increase revenue of the service provider, e.g., network carrier, while improving services to end users, e.g., mobile users. Some examples of location-based services that can be provided to the mobile user include:
  Providing the nearest business or service, such as an ATM or restaurant;
  Providing alerts, such as notification of a sale on gas or warning of a traffic jam;
  Providing weather reports which are germane to the location where the user is using the mobile device, etc.
An advantage of using location services is that the mobile user does not have to manually specify ZIP codes or other location identifiers to use location-based services.

For the network carrier, location-based services provide value add by enabling services such as:
  Resource tracking with dynamic distribution (e.g., taxis, service people, rental equipment, doctors, fleet scheduling, etc.);
  Finding people or information for the user (e.g., person by skill (doctor), business directory, navigation, weather, traffic, room schedules, stolen phone, emergency 911);
  Proximity-based notification (push or pull) (e.g., targeted advertising, buddy list, common profile matching (dating), automatic airport check-in);
  Proximity-based actuation (push or pull) (e.g., payment based upon proximity (EZ pass, toll watch).
In addition, location based services (LBS) are convenient for sharing location data between wireless devices to wireless devices and from wireless devices to stationary devices like a home computer or stationary tracking system or content provider, etc. This would allow a third party to determine an exact location of a mobile user such as, for example, a family member, friend, employee, etc.

Two methods are commonly in use to determine the location of a wireless device with a third method starting to become more popular. These methods include signal strength of cell towers that are near the wireless device (e.g., triangulation); GPS triangulation; and exposing the LBS as a web service.

The first method determines a wireless device's location by comparing the signal strength of cell towers that are near the wireless device. This method is called triangulation and is substantially the same method that GPS devices use to determine their location. The difference between cell triangulation and GPS triangulation, though, is the signals they use to determine location. The second method, GPS triangulation, uses satellites to determine a device location. In either case, the latitude and longitude are kept in the location services infrastructure.

Another method includes creating location based services by exposing the LBS as a web service. For example, when a device wants an update from the location based system, it sends a request with the proper authentication credentials and a unique identifier that describes the device that is being tracked. The LBS returns the coordinates of the device being queried.

One of many issues facing the actual commercial deployment of location based services is privacy of the mobile user. These issues imply that significant work still needs to be done around the whole area of location privacy. For example, the following issues arise with privacy:
  Determining location data associated with a target device and allowing external entities to access this information requires that the target device (or owner of that device) actually is aware of such access and has indicated so both implicitly and explicitly;
  A general purpose authorization model that is easy to implement and widely accepted has still not been "rolled out" by many wireless service providers; and
  Regulatory requirements require that exceptions be built into the infrastructure. For example location fixes for purposes of locating an emergency caller via the 911 infrastructure needs to be able to locate the caller regardless of their actual preferences.
Accordingly, there exists a need in the art to overcome the deficiencies and limitations described hereinabove.

SUMMARY

In a first aspect of the invention, a system comprises at least one module configured to provide fictitious location or route information of a mobile user to selected users or group of users based on a mobile user provided profile.

In another aspect of the invention, a method is provided on software, hardware or a combination of software and hardware. The method comprises receiving a request by one or more users to obtain location information of a mobile device, and sending fictitious location information or route information to the requesting one or more users based on a profile associated with the mobile device or user of the mobile device.

In another aspect of the invention, a computer program product comprises a computer usable medium having readable program code embodied in the medium. The computer program product includes at least one component operable to: store one or more users or groups of users in which to provide fictitious location or route information; store the fictitious location or route information; and provide the fictitious location or route information during a time window to a requesting third party.

In yet another aspect of the invention, a method is provided for deploying a location based service. The method comprises providing a computer infrastructure operable to at least provide fictitious location or route information of a mobile user to selected users or group of users based on a mobile user provided profile.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
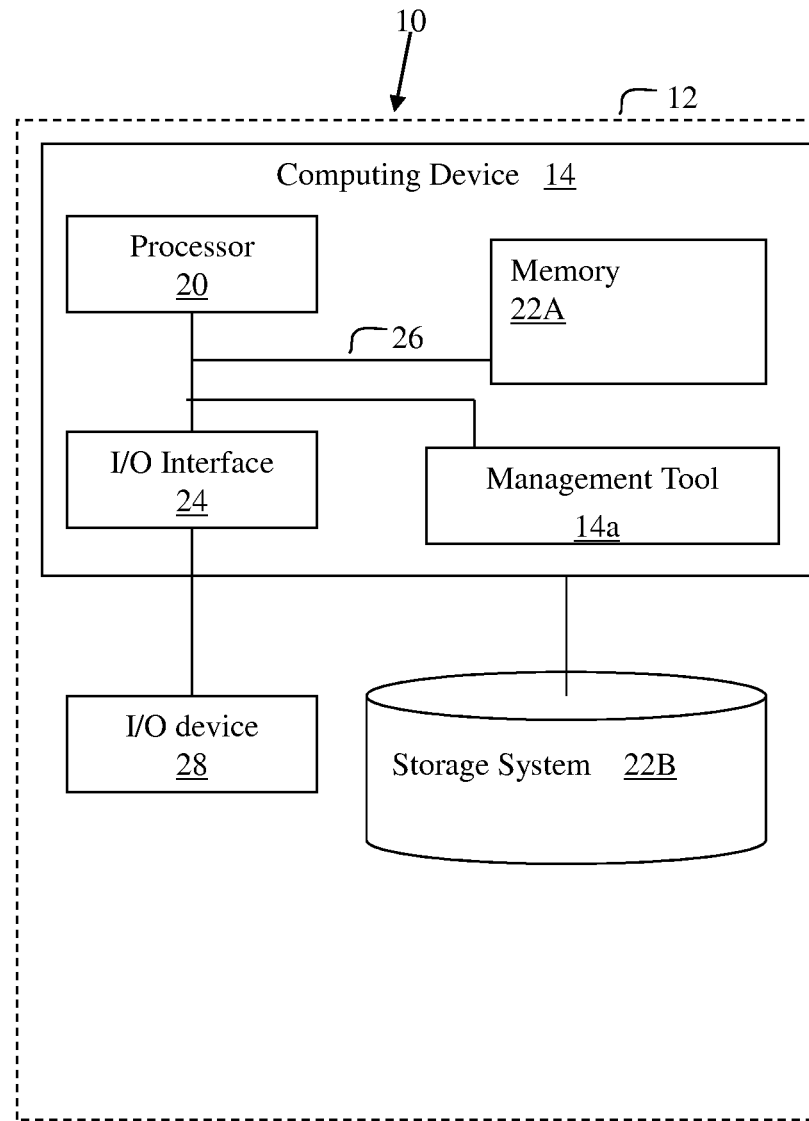
FIG. 1 is an illustrative environment for implementing the steps in accordance with the invention.

The invention generally relates to a system and method to provide location information of a mobile computing device. More specifically, the present invention relates to a system and method for providing privacy and limited exposure services for location based services to subscribing and requesting users. In implementation, the invention provides controls implemented by, for example, a location based service (LBS), which allow preferences to be taken into account for the mobile user to protect his/her privacy from third parties such as, for example, service providers, content providers, employees/employers, etc. The mobile user may opt into or out of the service during the call flow. So, for example, by using a subscriber preference the subscriber can opt into the location based service, with the intent to explicitly prevent the actual location fix from occurring for certain designated users. As such, in implementation, the present invention provides a mechanism of securely providing actual location information to trusted third parties while providing fictitious location information to non-trusted third parties. Also, the present invention improves operational efficiency associated with realizing location sharing between mobile users and trusted third parties for the purpose of providing location information of the mobile user.

Advantageously, the present invention can be used for different services. For example, a parent may subscribe to a child tracking service in which the parent can obtain the exact location (or route of travel) of the child at any time. The parent may opt to have other family members or trusted friends have access to such location information of the child. However, the parent, for safety concerns, would not want other third parties to have such location information. In such a case, the parent can either opt out of the service completely for other parties, or allow the service to provide fictitious location information to other third parties.

This may also be a powerful tool in law enforcement services, where law enforcement personnel can maintain and keep track of the location of patrolling law enforcement officers, while excluding nefarious individuals, etc. from obtaining this same information. In alternate embodiments, the law enforcement agency can publish fictitious location information to mislead the nefarious individuals.

In embodiments, the location information can be obtained by an agent sitting locally on the handheld device, at a service provider or carrier infrastructure. The agent can be used to determine location information using many different methodologies. By way of one example, a local agent residing on the handheld device can use locally cached location information obtained by GPS, A-GPS or mechanisms other than the telecommunications network in order to determine location information. In other embodiments, the agent can obtain information from control plane locating, e.g., the service provider (e.g., network carrier) obtains the location based on the signal-strength of the closest cell-phone towers.

Exemplary System Environment and Infrastructure

Privacy is one of the key inhibitors to the widespread adoption and deployment of location based services. For example, location based services become very inconvenient if the mobile user does not want a third party such as a content provider or service provider to know where the mobile user is actually located at a particular time. The easiest way to prevent such dissemination of location information is to turn off the ability to update location. The problem is that this would prevent anyone from seeing the location of the mobile user. As such, the present invention provides methods, which allow users to opt in or opt out of the location based services, as well as to provide fictitious locations and routes of travel during predetermined periods of times to designated requesting users. For example, the present invention, using the infrastructure of FIG. 1, can provide the following features:

Allow subscribers (targets) to pre-publish their actual location and publish a ghost (fictitious) location or ghost route. A ghost location is a fictitious location that may be stored in the user's profile or may be manually entered by the user by selecting a location from their device; and/or Allow for the provisioning of a ghost route, which is a route chosen from the user's current location or a predefined location to a different location.

Actual embodiments can include the following types of scenarios, for example,

A user identifies certain windows (times) during which his or her location is blocked during specific periods of time, when specific subscribers (or groups of subscribers) make a location request, allowing for further privacy and, in embodiments, allowing for a different location (a ghost location) to be used; and/or A user specifies a time window during which a specific route is masked (cloaked), allowing for specific subscribers (or subscriber groups) to be blocked during specific predefined routes being traversed by the target subscriber (mobile user). One embodiment could be a ghost route which is displayed to the requesting subscriber (or subscriber group), factoring in variables such as real time traffic and weather along the route, if necessary.

Both of the above scenarios, amongst others, allow the location based services (LBS) to protect the privacy of the mobile user even though they might have "opted in" for specific services as part of the base authorization model that is already a part of a wireless location based services infrastructure.

FIG. 1 shows an illustrative environment 10 for managing the processes in accordance with the invention. To this extent, the environment 10 includes a server 12 that can perform the processes described herein. In particular, the server 12 includes a computing device 14. The computing device 14 can be resident on a carrier network infrastructure, a content provider server, or other third party service provider (any of which is generally represented in FIG. 1). The computing device 14 may also be resident on a handheld device.

The computing device 14 includes a Management Tool (module or program control) 14a configured to make computing device 14 operable to perform the services described herein. The implementation of the Management Tool 14a, provided by an LBS, provides a speedy and efficient way in which a mobile user may allow the dissemination of actual or fictitious information, e.g., locations and routes, to selected third parties at selected times. By way of illustration, the Management Tool 14a can parse a user profile to determine that only certain requesting third parties obtain actual location or route information during predefined times and other third parties receive fictitious location or route information during predefined times, without the mobile user having to opt out of any services or terminate the services.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, the handheld device.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator or LBS, could offer to perform the processes described herein. In this case, the service provider can create, maintain, deploy, support, etc., the computer infrastructure that performs the process steps of the invention for one or more customers. These customers may be, for example, a mobile user or a third party requesting information about the location and/or route of the subscribing mobile user. In return, the service provider can receive payment from the customer(s) under a subscription and/or fee agreement and/or the service provider can receive payment from the sale of advertising content to one or more third parties.

Exemplary Processes

The wireless device or LBS may store user defined profiles in the storage system 22B of FIG. 1 in order to determine whether to allow certain location information to be provided to certain third parties. For example, as shown in Table 1, the profiles may include selected users such as wireless devices, groups of wireless devices, service providers, content providers etc. that have permission or limited permission to view a user's actual or fictitious location during certain time periods, as part of the authorization infrastructure.

TABLE 1

|  | USER 1 (wireless device) | GROUP I (including USERS 2, 5, and 10) | CONTENT OR SERVICE PROVIDER 1 |
|---|---|---|---|
| TIME | ALL | 10 AM TO 1 PM | 2 PM TO 6 PM |
| DATE | ALL | EVERY TUESDAY | May 12, 2008 |
| LOCATION | ACTUAL | FICTITIOUS 1 | FICTITIOUS 2 |
| ROUTE | FICTITIOUS 1 | FICTITIOUS 1 | FICTITIOUS 4 |

In this illustrative non-limiting example shown in Table 1, the mobile user can simply provide a specific profile to ensure that only certain location information is sent to certain users at certain times. This will allow the mobile user to selectively protect its privacy as it deems fit. Thus, in one example, the mobile user can select a timeframe in which certain location information can be cloaked, e.g., provide fictitious location or route information, for a certain user or group of users. These profiles may be maintained, deployed, created, supported on a computing infrastructure by a service provider for a fee, in which case the service provider would block or allow certain location information to be passed to the requesting user after looking up such information in the look-up table. In embodiments, this information can be kept on a carrier infrastructure, which would act as a service provider (LBS).

As an alternative or additional embodiment, the mobile user can detect when a third party requests location information, e.g., by an alert from the mobile device, itself, or the service provider, and provide certain permissions at such time. These permissions may include, for example, blocking the location information request, or allowing actual location or route information or fictitious location or route information to be sent to the third party.

In the case of a web service based implementation, the system permits the mobile user to send its mobile device identifier or username or other identifier to establish them as a unique user. The LBS (e.g., web service) can then check to see if the mobile user authorizes another user (third party) to use the wireless devices location tracking, during the authorization process (e.g., a matching process). If not, the LBS can check if the third party is to receive cloaked data. If so, the actual location is not returned, and either the location is not sent at all or an alternate (fictitious) location is given. Similarly a requesting user that is subscribing to a location queue may be redirected to the cloak queue that contains the cloaked information for the wireless device. The LBS can either send a blank location or send out a different location to the requesting user or a group of users. These features can be implemented on the computing infrastructure of FIG. 1, with an exemplary profile table as shown by Table 1.

Figure 2:
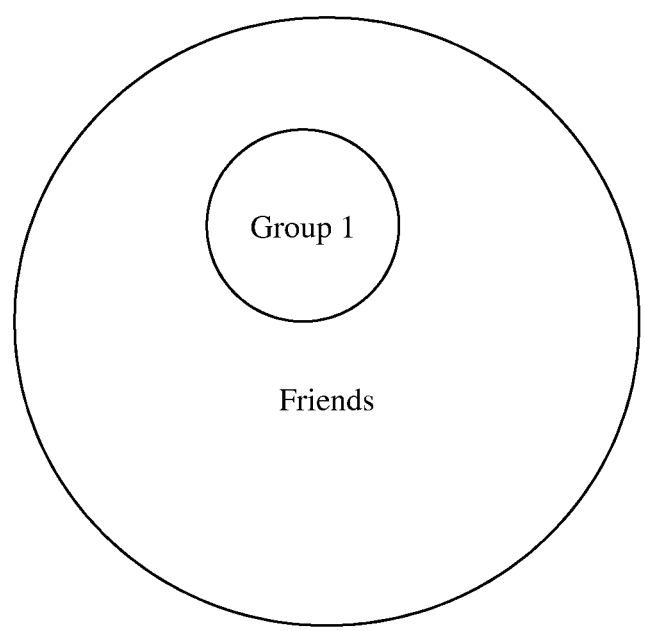
FIG. 2 shows a general schematic overview of an implementation of the present invention.

As shown in FIG. 2, the LBS can include a "friends" list of the users that are allowed to access the location of the wireless device. The friend may be any user of the LBS such as, for example, an employee, employer, family member, content provider, etc. Within the list, the owner (subscribing mobile user) can establish groups within the LBS that allow the user to select a subset of friends that they may provide an alternate location, which is also shown representatively in Table 1.

Figure 3:
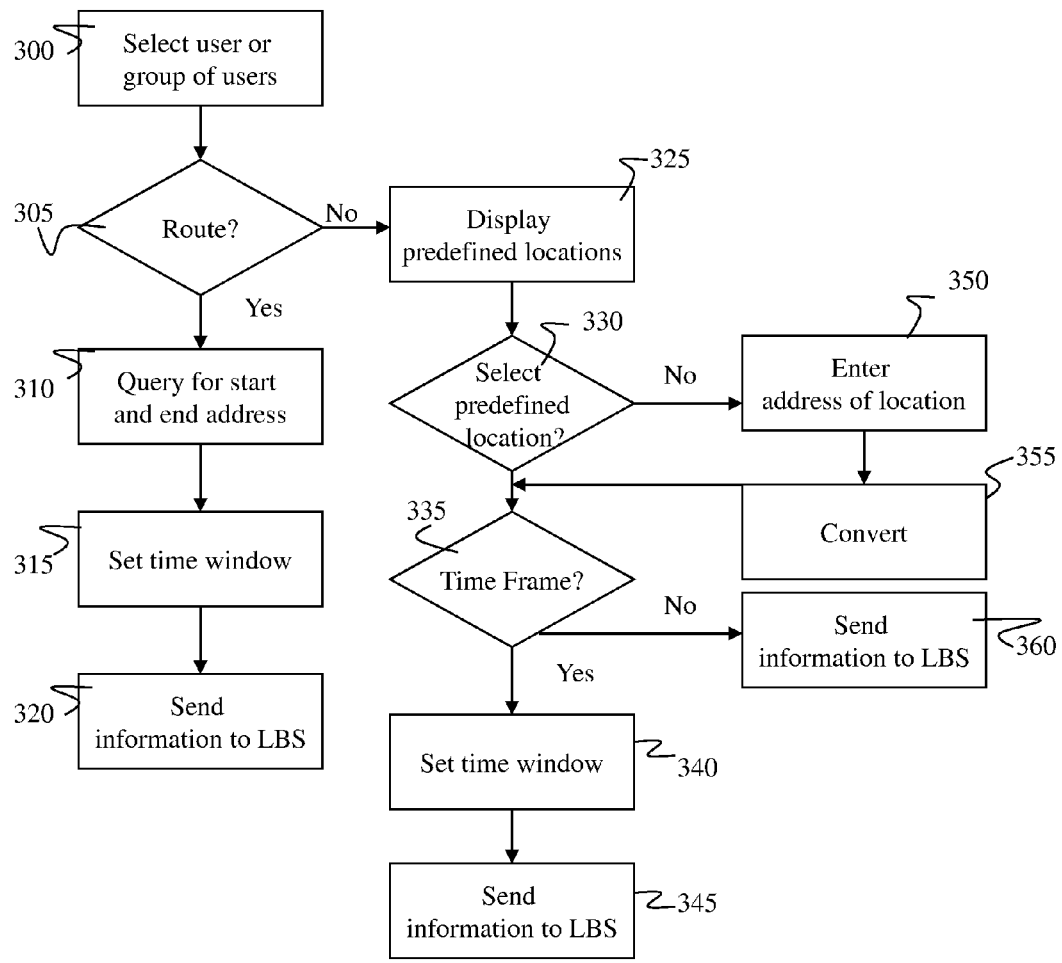
FIGS. 3-5 show flow charts of exemplary processes in accordance with aspects of the invention.
Figure 4:
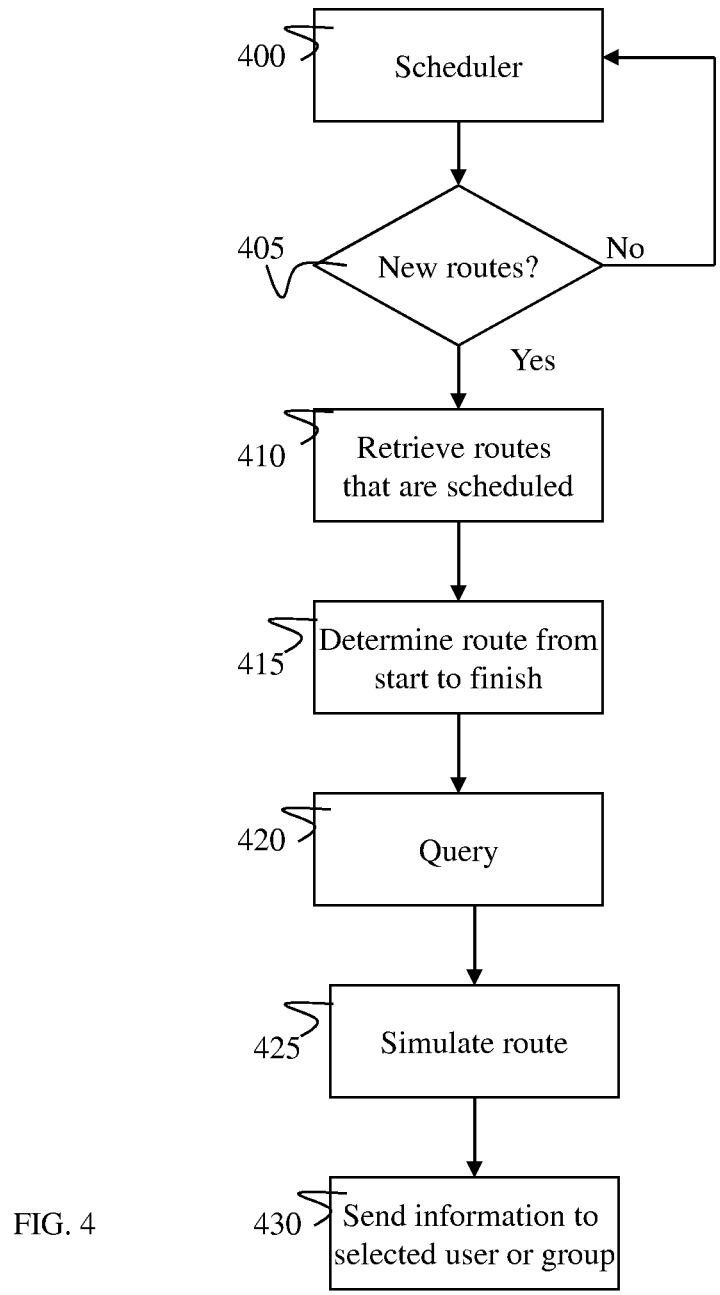
Figure 5:
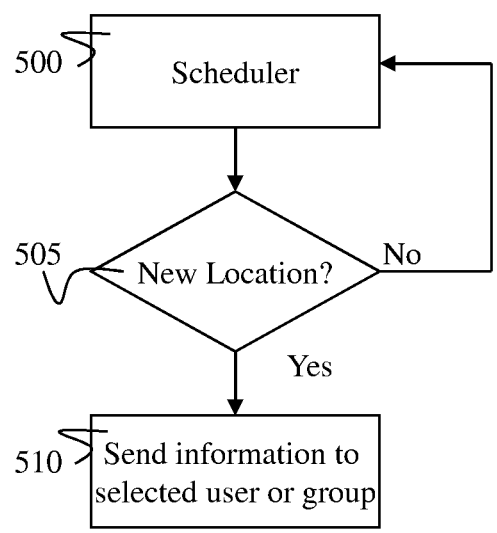

FIGS. 3-5 are flow charts implementing steps of different aspects of the invention, which may be implemented in the environment of FIG. 1 or the user's handheld device. FIGS. 3-5 may equally represent a high-level block diagram of the invention. The steps of FIGS. 3-5 may be implemented and executed from either a server, in a client server relationship, or they may run on a user workstation (which can be generally represented in FIG. 1). Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

FIG. 3 illustrates an exemplary process in which the service provider (LBS) can publish route information in accordance with the invention. That is, the steps of FIG. 3 may be used to generate a profile table such as that provided in Table 1 by querying the user to provide profiles and/or rules germane to the user (or user's unique ID). The steps of FIG. 3 may be implemented on the user's handheld device and pushed to the computer infrastructure of FIG. 1, for example, for use by the LBS. In an alternate embodiment, the steps of FIG. 3 may be implemented directly in the infrastructure of FIG. 1, which is acting as LBS or service provider.

In particular, at step 300, a subscribing user selects users or groups of users in which to provide fictitious locations or routes. At step 305, the program control requests the subscribing user to determine whether to send a route or location to the selected users or groups of users. If the user opts to send a fictitious route, at step 310 the program control will query the subscribing user for a start address and an end address of the route. The user will then provide such information and, in embodiments, the program control may convert such information into a longitudinal and latitudinal coordinate system, either on the handheld device or the infrastructure of FIG. 1. At step 315, the user sets a time window for the requesting third party (users or groups of users) to receive such information. This time window can be one or more dates, time of day, start time and end time, day(s) of the week, or any possible combination thereof. At step 320, the program control sends the start and end points of the route, time window and user or user groups to an LBS for further processing. As noted above, the LBS may be implemented in an environment similar to FIG. 1, which is maintained, supported, deployed and created by a service provider such as the carrier infrastructure.

If at step 305 it was determined that the subscribing user does not want to provide a route, at step 325, predefined fictitious locations can be provided to the LBS. For example, the user can be presented with specific locations that were previously visited by the user, or the user can enter in new locations via a handheld device, stationary device (at home or at the office), etc. At step 330, a determination is made as to whether the user selected a predefined fictitious location. If so, at step 335 the program control will query the user for a time window in which such locations should be provided to the users or user groups. Again, this time period can be one or more dates, time of day, start time and end time, day(s) of the week, or any possible combination thereof. At step 340, the subscribing user can select a time window. At step 345, the program control sends the location information, time window and user or user groups to an LBS for further processing.

If at step 330 the user did not select a predefined location, at step 350 the program control will query the user to enter a specific address or identifying landmark of the location, at which time the user will provide such information via the handheld device, stationary device, etc. At step 355, the location will be converted to a longitude and latitude coordinate system using, for example, a look-up service (or table). The system will return to step 335. Also, if at step 335, the user does not enter a time window, the system will proceed to step 360, where the program control sends the location information and user or user groups to an LBS for further processing.

FIG. 4 shows a process of location privacy cloaking for fictitious routing information in accordance with an aspect of the invention. The steps of FIG. 4 may be implemented on the computer infrastructure of FIG. 1, for example, for use by the LBS. In particular, at step 400, the LBS checks its scheduler to determine if a service should be instituted for a particular route. At step 405, a determination is made as to whether there are any routes to be cloaked. If not, the process returns to step 400.

If there are routes to be cloaked, at step 410, the LBS retrieves route information for the scheduled time. At step 415, the LBS determines the route from start to end. This may be performed with any type of off the shelf map generating software, known to those of skill in the art.

In optional step 420, the LBS queries traffic patterns from traffic services, weather from weather services and/or other criteria that might affect the flow and timing of traffic along the selected route. At step 425, the LBS will simulate or alter the route, with traffic conditions and speeds, if queried, along the entire route. In this way, the requesting user will not typically see the same exact timing and speed of the subscribing user's route when there are different weather and traffic patterns, thus providing a more realistic view of the subscribing user's fictitious route. At step 430, the LBS will publish the fictitious route to the selected users and/or group of users.

FIG. 5 shows a process of location privacy cloaking for fictitious location information in accordance with an aspect of the invention. The steps of FIG. 5 may be implemented on the computer infrastructure of FIG. 1, for example, for use by the LBS. In particular, at step 500, the LBS checks its scheduler to determine if a service should be instituted for a particular location. At step 505, a determination is made as to whether there are any locations to be cloaked. If not, the process returns to step 500. If there are locations to be cloaked, at step 510, the LBS will publish the fictitious location to the selected users and/or group of users.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A system comprising:
   at least one computing device configured to:
   receive a request by one or more users to obtain location information of a mobile user;
   determine to send a fictitious route of travel information of the mobile user to selected users or a group of users or the requesting one or more users;
   query the mobile user for a start address and an end address of the fictitious route of travel information of the mobile user, at a same time, after the determining to send the fictitious route of travel information, the fictitious route of travel information being a route chosen from a predefined location to a different location;
   provide the fictitious route of travel information to selected users or a group of users or the requesting one or more users, based on a mobile user provided profile,
   wherein the computing device is further configured to:
   determine whether the fictitious route of travel information is to be cloaked;
   when the fictitious route of travel information is to be cloaked, retrieve information of the fictitious route of travel information for a scheduled time;
   determine the fictitious route of travel information from the start address to the end address;
   query at least one of traffic patterns from traffic services and weather from weather services; and
   alter the fictitious route of travel information with at least one of the queried traffic patterns and the queried weather patterns.

2. The system of claim 1, wherein the at least one computing device is further configured to allow the mobile user to opt in or opt out of location based services while still providing actual location based information to selected requesting third parties.

3. The system of claim 1, wherein the at least one computing device is further configured to provide fictitious location information or the fictitious route of travel information of the mobile user to the selected users or the group of users during mobile user selected time windows.

4. The system of claim 1, wherein the mobile user provided profile includes at least one of: the selected users or the group of users which receive fictitious location information or the fictitious route of travel information; time windows to send the fictitious location information or the fictitious route of travel information; selected users or groups of users which receive actual location or route information; and time windows to send the actual location or route information.

5. The system of claim 1, wherein the at least one computing device is configured to receive permissions from the mobile user to, one of, send fictitious location information or the fictitious route of travel information to a third party and block actual location or route information to the third party.

6. The system of claim 1, wherein the at least one computing device is configured to receive an identifier of the mobile user to establish the mobile user as a unique user and to match the mobile user with the mobile user provided profile.

7. The system of claim 6, wherein the at least one computing device comprises a web service module that checks if the mobile user authorized a third party to use a wireless device location tracking of the mobile user.

8. The system of claim 7, wherein the at least one computing device is configured to receive a request from a third party to obtain actual location information of the mobile user.

9. The system of claim 8, wherein the at least one computing device is configured to detect that the third party is one of the users or group of users which will be denied access to actual location information of the mobile user.

10. The system of claim 1, wherein the at least one computing device is further configured to:
   set a mobile user selected time window for the selected users or the group of users to receive the fictitious route of travel information; and
   check a scheduler to determine if a service should be instituted for providing the fictitious route of travel information.

11. The system of claim 1, wherein the fictitious route of travel information is not an actual route of the mobile user.

12. A method implemented in a computer infrastructure, comprising:
   receiving a request by one or more users to obtain location information of a mobile device;
   determining to send a fictitious route of travel information of the mobile device to the requesting one or more users;
   querying the mobile device for a start address and an end address of the fictitious route of travel information of the mobile device, at a same time, after the determining to send the fictitious route of travel information, wherein the fictitious route of travel information is a route chosen from a predefined location to a different location; and
   sending the fictitious route of travel information to the requesting one or more users based on a profile associated with the mobile device or a user of the mobile device, said method further comprising:

determining whether the fictitious route of travel information is to be cloaked;

when the fictitious route of travel information is to be cloaked, retrieving information of the fictitious route of travel information for a scheduled time;

determining the fictitious route of travel information from the start address to the end address;

querying at least one of traffic patterns from traffic services and weather from weather services; and altering the fictitious route of travel information with at least one of the queried traffic patterns and the queried weather patterns.

13. The method of claim 12, wherein the sending is provided during a mobile user time window.

14. The method of claim 12, further comprising parsing a look-up table to determine whether the requesting one or more users is provided with permission to receive actual location or route information of the mobile device based on at least one of a time window and user defined rules.

15. The method of claim 12, further comprising:

setting a mobile user selected time window for the requesting one or more users to receive the fictitious route of travel information;

checking a scheduler to determine if a service should be instituted for providing the fictitious route of travel information;

querying at least one of traffic patterns from traffic services and weather from weather services; and altering the fictitious route of travel information with at least one of the queried traffic patterns and the queried weather patterns.

16. The method of claim 12, wherein the fictitious route of travel information is not an actual route of the mobile device.

17. A computer program product comprising a tangible computer usable storage memory having readable program code tangibly embodied in the storage memory, the computer program product includes at least one component operable to:

store one or more users or groups of users in which to provide a fictitious route of travel information of a mobile user;

determine to send the fictitious route of travel information of the mobile user to a requesting third party;

query the mobile user for a start address and an end address of the fictitious route of travel information, at a same time, after the determining to send the fictitious route of travel information, wherein the fictitious route of travel information is a route chosen from a predefined location to a different location;

store the fictitious route of travel information;

provide the fictitious route of travel information during a mobile user selected time window to the requesting third party of the one or more users or groups of users;

set the mobile user selected time window for the requesting third party to receive the fictitious route of travel information;

check a scheduler to determine if a service should be instituted for providing the fictitious route of travel information;

determine whether the fictitious route of travel information is to be cloaked;

when the fictitious route of travel information is to be cloaked, retrieve information of the fictitious route of travel information for a scheduled time;

determine the fictitious route of travel information from the start address to the end address;

query at least one of traffic patterns from traffic services and weather from weather services; and alter the fictitious route of travel information with at least one of the queried traffic patterns and the queried weather patterns.

18. The computer program of claim 17, wherein the at least one component is operable to:

store one or more permitted users or groups of users in which to provide actual location or route information; and provide the actual location or route information during a time window to the one or more permitted users or groups of users.

19. The computer program of claim 17, wherein the fictitious route of travel information is not an actual route of the mobile user.

* * * * *